(12) United States Patent
Martin et al.

(10) Patent No.: US 11,788,633 B1
(45) Date of Patent: Oct. 17, 2023

(54) SPOOLS FOR SPOOL VALVE ASSEMBLIES AND METHODS OF FABRICATING SPOOLS

(71) Applicant: Caterpillar Inc., Peoria, IL (US)

(72) Inventors: Kevin L. Martin, Washburn, IL (US); Paul A. Zwart, Dunlap, IL (US); Michael C. Marstall, Peoria, IL (US); Mikhail A. Sorokin, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/396,162

(22) Filed: Aug. 6, 2021

(51) Int. Cl.
F16K 11/07 (2006.01)
B33Y 80/00 (2015.01)

(52) U.S. Cl.
CPC .......... F16K 11/0716 (2013.01); B33Y 80/00 (2014.12)

(58) Field of Classification Search
CPC ............... F16K 11/0708; F16K 11/007; F16K 11/0716; Y10T 137/8671
See application file for complete search history.

(56) References Cited

U.S. PATENT DOCUMENTS

| | | | |
|---|---|---|---|
| 3,635,249 A | 1/1972 | Kirkman | |
| 4,220,174 A * | 9/1980 | Spitz | F16K 11/0716 137/625.68 |
| 6,450,194 B1 * | 9/2002 | Wasson | F15B 13/0402 137/625.69 |
| 9,429,240 B2 | 8/2016 | Nagaoka et al. | |
| 10,495,119 B2 | 12/2019 | Kimpara | |
| 10,508,746 B2 | 12/2019 | Cis et al. | |
| 11,300,222 B1 * | 4/2022 | Higgins | F16K 31/1223 |
| 2017/0009896 A1 | 1/2017 | Bugatti | |
| 2021/0018113 A1 | 1/2021 | Amrhein et al. | |

FOREIGN PATENT DOCUMENTS

| | | | |
|---|---|---|---|
| CN | 113958726 A * | 1/2022 | |
| DE | 102016220855 A1 | 4/2018 | |
| KR | 102114669 B1 | 5/2020 | |
| WO | WO-0210626 A1 * | 2/2002 | F16K 11/07 |

OTHER PUBLICATIONS

Translation of CN 113958726 (Year: 2022).*
Translation of WO 0210626 (Year: 2022).*
International Search Report and Written Opinion for Int'l. patent appln. PCT/US2022/038261 (dated Nov. 8, 2022, 12 pgs.).

* cited by examiner

Primary Examiner — Michael R Reid
(74) Attorney, Agent, or Firm — von Briesen & Roper, s.c.

(57) ABSTRACT

A spool for a spool valve assembly defines a spool longitudinal axis and includes a first land module defining a first land module circumferential surface, a second land module defining a second land module circumferential surface, and a first metering module. The first metering module has a first end cap and a second end cap. The first end cap is coupled to the first land module, and the second end cap is coupled to the second land module, to form the spool. The first metering module may further include at least two pillars extending from the first end cap to the second end cap, wherein the at least two pillars are entirely disposed within a virtual first metering module hollow cylinder area that surrounds a virtual first metering module central core area concentric with the spool longitudinal axis.

20 Claims, 5 Drawing Sheets

SPOOLS FOR SPOOL VALVE ASSEMBLIES AND METHODS OF FABRICATING SPOOLS

TECHNICAL FIELD

The present disclosure relates to hydraulic valves used on heavy machinery employed in the earth moving, construction, and mining industries, or the like. Specifically, the present disclosure relates to a valve component, such as a spool, and methods of fabricating spools.

BACKGROUND

Heavy machinery, such as those employed in the earth moving, construction, and mining industries, employ various systems and work implements that are powered hydraulically to effectuate movement and work, such as moving payloads via buckets, breaking up materials using a hydraulic hammer, lifting a boom, etc. These systems and work implements include hydraulic valve assemblies for controlling flow of hydraulic fluid. A spool valve assembly is a type of hydraulic valve assembly that includes a housing defining a spool cavity in which a spool is disposed. The spool typically includes land sections, which slidingly contact the spool cavity, and metering sections, which have one or more voids to permit fluid flow therethrough.

U.S. Pat. No. 10,508,746, issued Dec. 17, 2019, (the '746 Patent) describes a spool valve having a spool formed as a single, monolithic component that includes both lands for blocking fluid flow and chambers for permitting fluid flow. The spool of the '746 Patent also has a solid core running the entire length of the spool. While the '746 Patent may be beneficial, a better spool is desired.

SUMMARY OF THE DISCLOSURE

In one aspect of the present disclosure, a spool is disclosed that defines a spool longitudinal axis. The spool includes a first land module defining a first land module circumferential surface, a second land module defining a second land module circumferential surface, and a first metering module. The first metering module has a first end cap coupled to the first land module, and a second end cap coupled to the second land module.

In another aspect of the disclosure, a spool valve assembly is disclosed. The spool valve assembly includes a housing having a housing inner surface defining a spool cavity. The housing further defines a first port, a second port, and a third port, wherein each of the first port, the second port, and the third port extends through the housing inner surface and fluidly communicates with the spool cavity. A spool is disposed in the spool cavity and defines a spool longitudinal axis. The spool includes a first land module defining a first land module circumferential surface sized for sliding contact with the housing inner surface, a second land module defining a second land module circumferential surface sized for sliding contact with the housing inner surface, and a third land module defining a third land module circumferential surface sized for sliding contact with the housing inner surface. The spool further includes a first metering module, having a first end cap coupled to the first land module and defining at least one metering pocket, and a second end cap coupled to the second land module and defining at least one metering pocket. Additionally, the spool includes a second metering module having a first end cap coupled to the second land module and defining at least one metering pocket, and a second end cap coupled to the third land module and defining at least one metering pocket.

In yet another aspect of the disclosure, a method is disclosed of forming a spool for use with a housing having a housing inner surface defining a spool cavity. The method includes forming a first land module with a first land module circumferential surface sized for sliding contact with the housing inner surface, forming a second land module with a second land module circumferential surface sized for sliding contact with the housing inner surface, and forming, via additive manufacturing, a first metering module having a first end cap and a second end cap. The method further includes coupling the first end cap of the first metering module to the first land module, and coupling the second end cap of the first metering module to the second land module. The first land module, the first metering module, and the second land module extend along a spool longitudinal axis.

DETAILED DESCRIPTION

Figure 1:
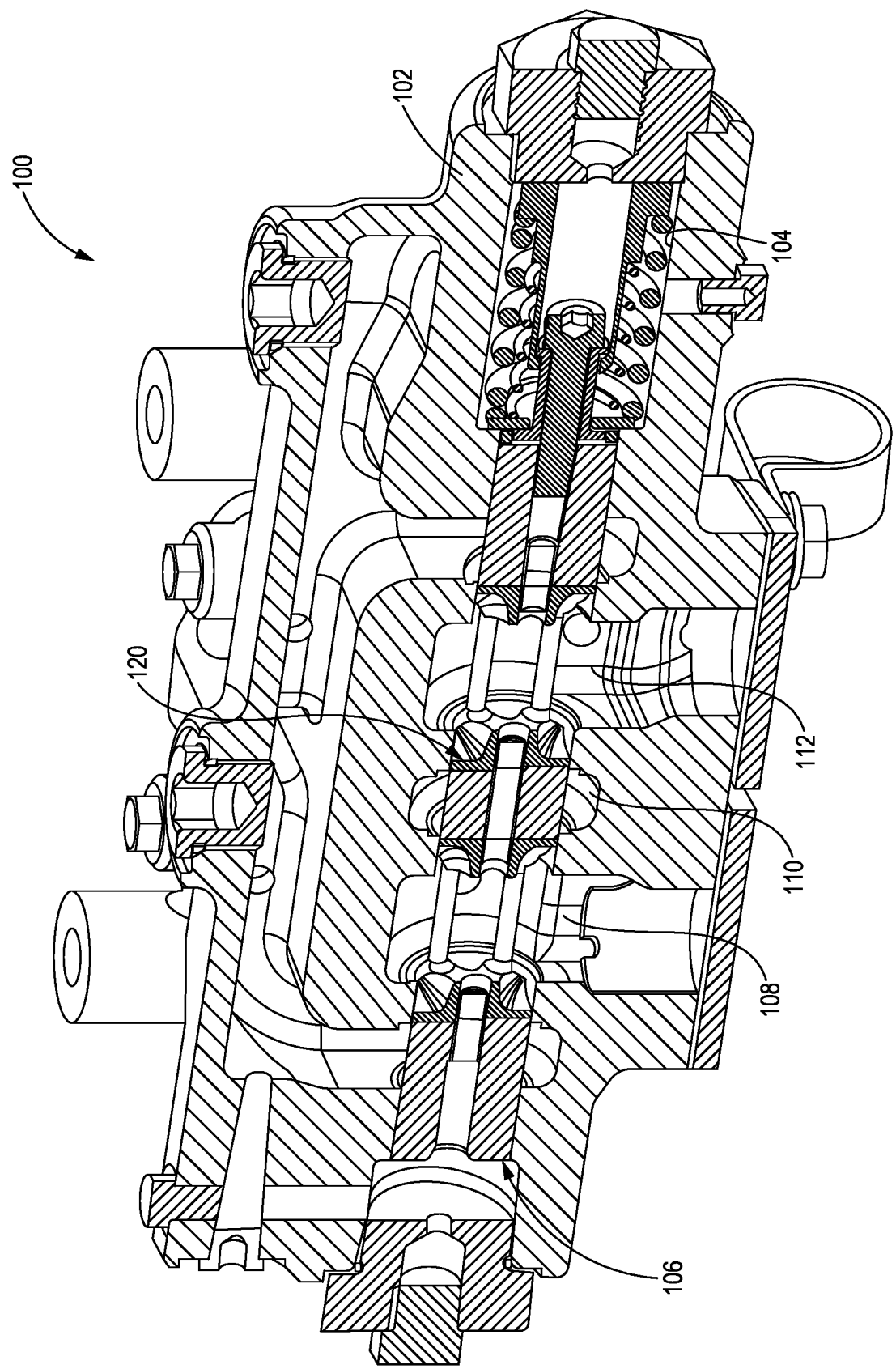
FIG. 1 is a perspective view, in cross-section, of an exemplary spool valve assembly including an embodiment of a spool, according to the present disclosure.

Reference will now be made in detail to specific embodiments or features, examples of which are illustrated in the accompanying drawings. Generally, corresponding reference numbers will be used throughout the drawings to refer to the same or corresponding parts, unless otherwise specified. FIG. 1 illustrates one example of a spool valve assembly 100 that incorporates the features of the present disclosure. The spool valve assembly 100 may be provided as part of a hydraulic system, such as a steering system, a brake system, an implement control system, a pump control system, an engine system, or a fuel control system, used on a machine, such as a wheel loader, motor grader, a work tool, or an excavator.

FIG. 1 illustrates an exemplary spool valve assembly 100 that includes a housing 102 having a housing inner surface 104 defining a spool cavity 106. In the illustrated embodiment, the housing further defines a first port 108, a second port 110, and a third port 112. Each of the first port 108, the second port 110, and the third port 112 extends through the housing inner surface 104 and fluidly communicates with the spool cavity 106. The first, second, and third ports 108, 110, 112 fluidly communicate with other voids within the housing 102 and/or with components coupled to the housing 102, thereby to direct fluid flow through the housing 102.

The spool valve assembly 100 also includes a spool 120 disposed in the spool cavity 106 for selectively establishing fluid communication between the first, second, and third ports 108, 110, 112. The spool 120 defines a spool longitudinal axis 122 along which the spool 120 is translated during operation.

Figure 2:
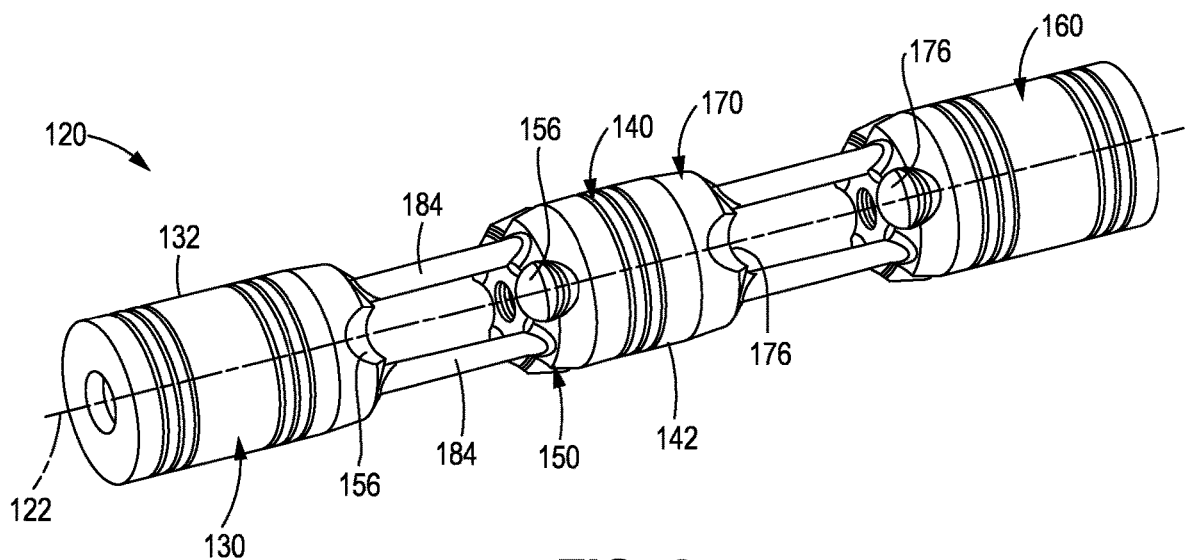
FIG. 2 is an enlarged, perspective view of the spool of FIG. 1.
Figure 3:
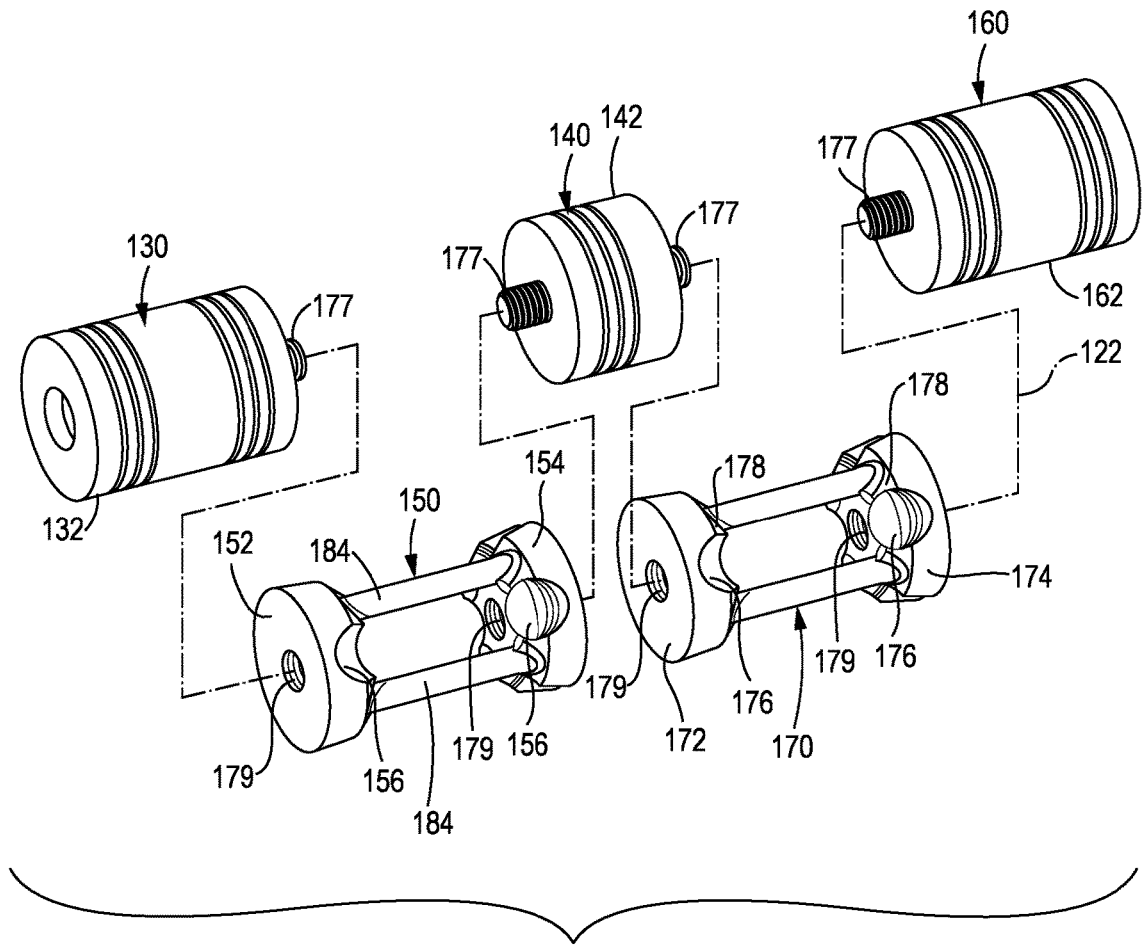
FIG. 3 is an exploded, perspective view of the spool of FIG. 1.
Figure 4:
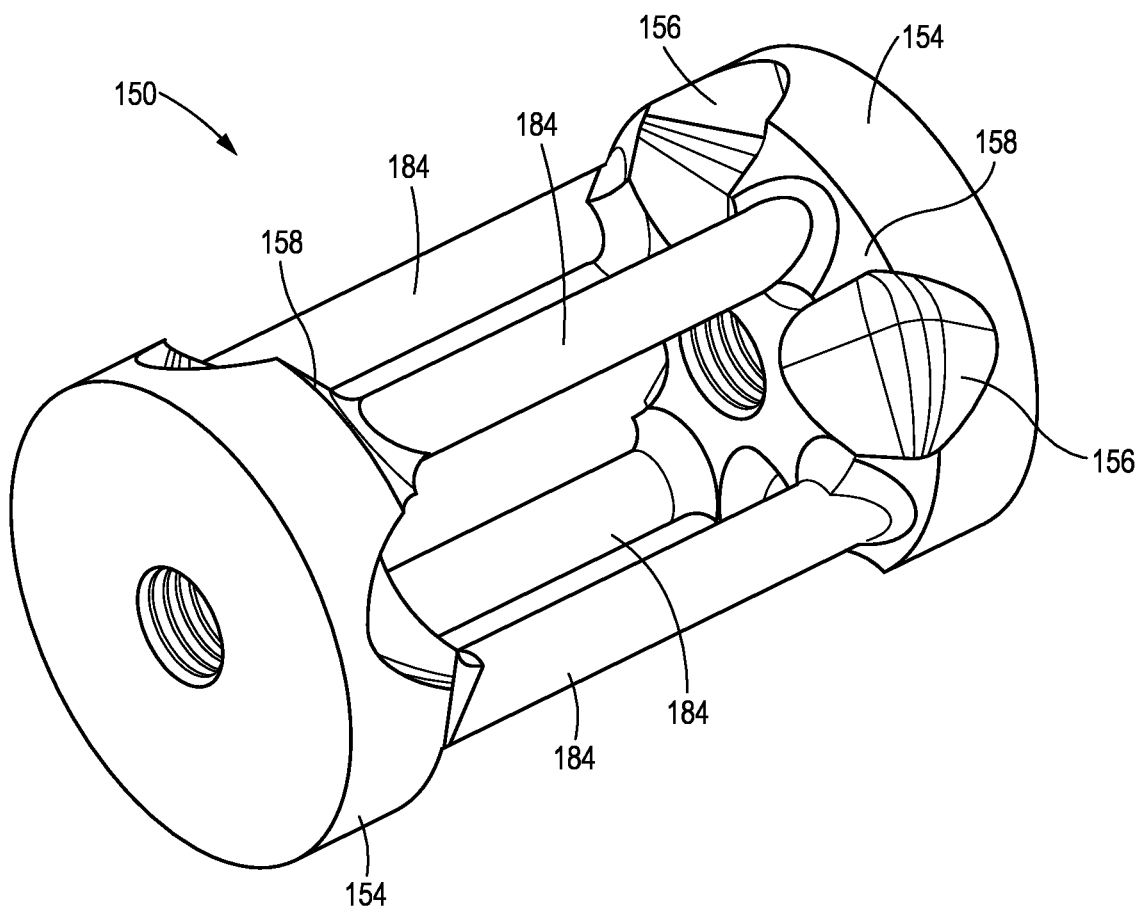
FIG. 4 is an enlarged, perspective view of a first metering module of the spool of FIGS. 1-3.
Figure 5:
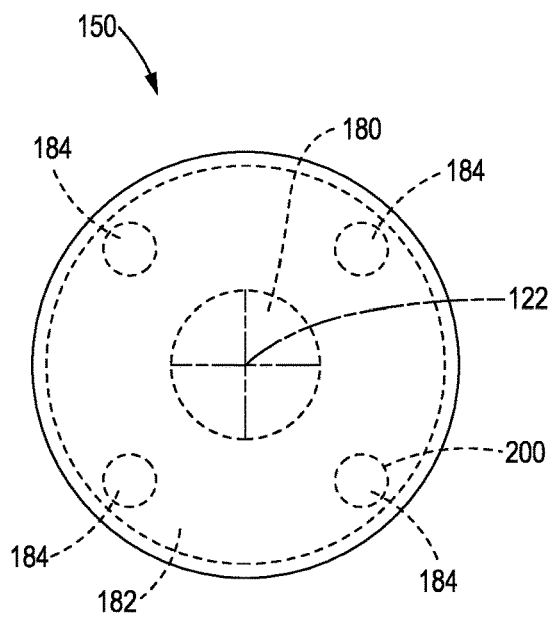
FIG. 5 is an end view of the first metering module of the spool shown in FIGS. 1-4.

According to certain aspects of the present disclosure, the spool 120 is formed of multiple modules that are fabricated independently and subsequently assembled. As best shown in FIGS. 1-3, for example, the spool 120 includes a first land module 130 defining a first land module circumferential surface 132 sized for sliding contact with the housing inner surface 104. The spool 120 further includes a second land module 140, spaced from the first land module 130, defining a second land module circumferential surface 142 sized for sliding contact with the housing inner surface 104. A first metering module 150 structurally couples the first land module 130 to the second land module 140. More specifically, the first metering module 150 includes a first end cap 152 coupled to the first land module 130 and a second end cap 154 coupled to the second land module 140.

In some examples, the spool 120 includes more than two land modules and one metering module. In the illustrated example, the spool 120 further includes a third land module 160 defining a third land module circumferential surface 162 sized for sliding contact with the housing inner surface 104. Additionally, the spool 120 may have a second metering module 170 structurally coupling the second land module 140 to the third land module 170. The second metering module 170 may include a first end cap 172 coupled to the second land module 140 and a third end cap 174 coupled to the second land module 140. In other examples, the spool 120 may include still further land modules and metering modules as required for a particular application.

After independent fabrication, the modules may be coupled together to form the spool 120. For example, each of the land modules 130, 140, and 160 may include male threaded portions 177 and each of the metering modules 150, 170 may include female threaded portions 179, so that the modules may be threadably coupled.

The first and second metering modules 150, 170 may be configured to improve metering of fluid flow during operation of the spool valve assembly 100. As best shown in FIGS. 2 and 3, each of the first end cap 152 and the second end cap 154 of the first metering module 150 includes at least one metering pocket 156. Similarly, each of the first end cap 172 and the second end cap 174 of the second metering module 170 includes at least one metering pocket 176. In the illustrated embodiment, each end cap is shown having four metering pockets 156 or 176 spaced circumferentially about the associated end cap, however the exact number of metering pockets on each end cap may be greater or fewer than four. Furthermore, while the metering pockets 156, 176 are illustrated as crescent-shaped indents, the metering pockets 156, 176 may take other shapes. Still further, each end cap may be formed with a bevel surface 158 or 178, and each metering pocket 156, 176 extends into a respective bevel surface 158, 178.

According to additional aspects of the present disclosure, each of the first metering module 150 and the second metering module 170 is constructed to have reduced weight and improved fluid flow therethrough, while maintaining structural integrity. More specifically, instead of employing a conventional solid core, each of the first and second metering modules 150, 170 includes discrete structural components, referred to herein as "pillars," located around a perimeter of the module. For example, as best shown in FIGS. 2-5, the first metering module 150 defines a virtual first metering module central core area 180 concentric with the spool longitudinal axis 122, and a virtual first metering module hollow cylinder area 182 surrounding the virtual first metering module central core area 180. The first metering module 150 includes at least two pillars 184 that extend between the first end cap 152 of the first metering module 150 and the second end cap 154 of the first metering module 150. The at least two pillars 184 of the first metering module 150 are entirely disposed within the virtual first metering module hollow cylinder area 182.

Figure 6:
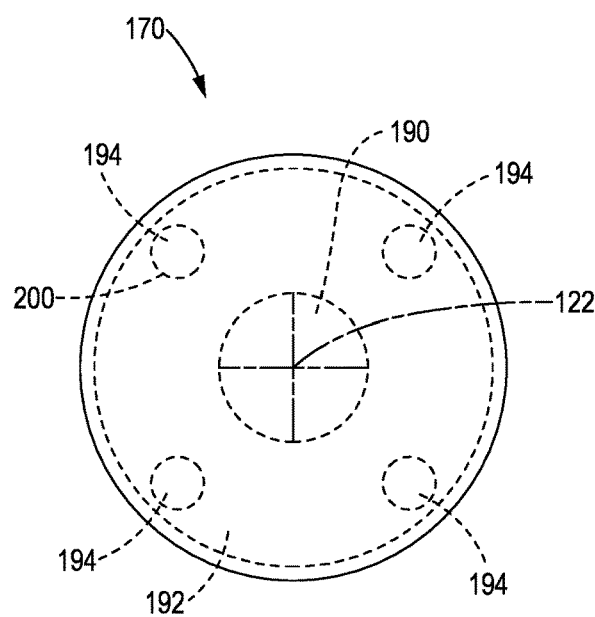
FIG. 6 is an end view of a second metering module of the spool shown in FIGS. 1-3.

Similarly, as best shown in FIGS. 2, 3, and 6, the second metering module 170 defines a virtual second metering module central core area 190 concentric with the spool longitudinal axis 122, and a virtual second metering module hollow cylinder area 192 surrounding the virtual second metering module central core area 190. The second metering module 170 includes at least two pillars 194 that extend between the first end cap 172 of the second metering module 170 and the second end cap 174 of the second metering module 170. The at least two pillars 194 of the second metering module 170 are entirely disposed within the virtual second metering module hollow cylinder area 192.

As used herein, "virtual" means having the attributes of an entity without possessing its physical form. For example, a virtual center core area is an intangible or reference area which may be defined relative to other physical and/or intangible entities. In the illustrated embodiments, the virtual first metering module central core area 180 and the virtual second metering module central core area 190 have cylindrical shapes, while the virtual first metering module hollow cylinder area 182 and the virtual second metering module hollow cylinder area 192 have hollow cylindrical shapes.

By locating the pillars 184, 194 outside of the center cores of the first and second metering modules 150, 170, the spool 120 reduces the amount of turbulence produced as fluid flows through the first and second metering modules 150, 170. Additionally, the locating the pillars 184, 194 closer to the perimeters of the first and second metering modules 150, 170 reduces weight while maintaining structural integrity.

Figure 7:
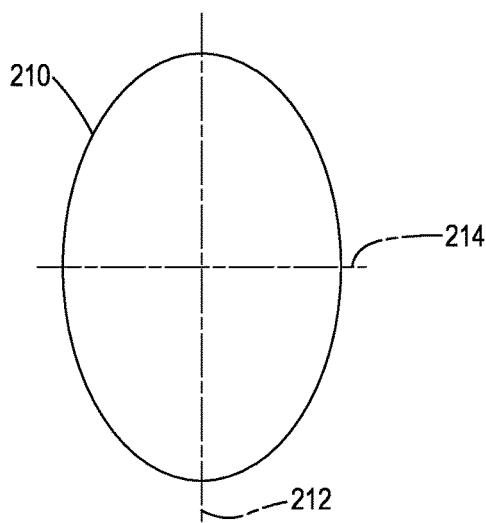
FIG. 7 is a schematic view of a cross section of another embodiment of a pillar that can be used in the spool of FIGS. 1-3.
Figure 8:
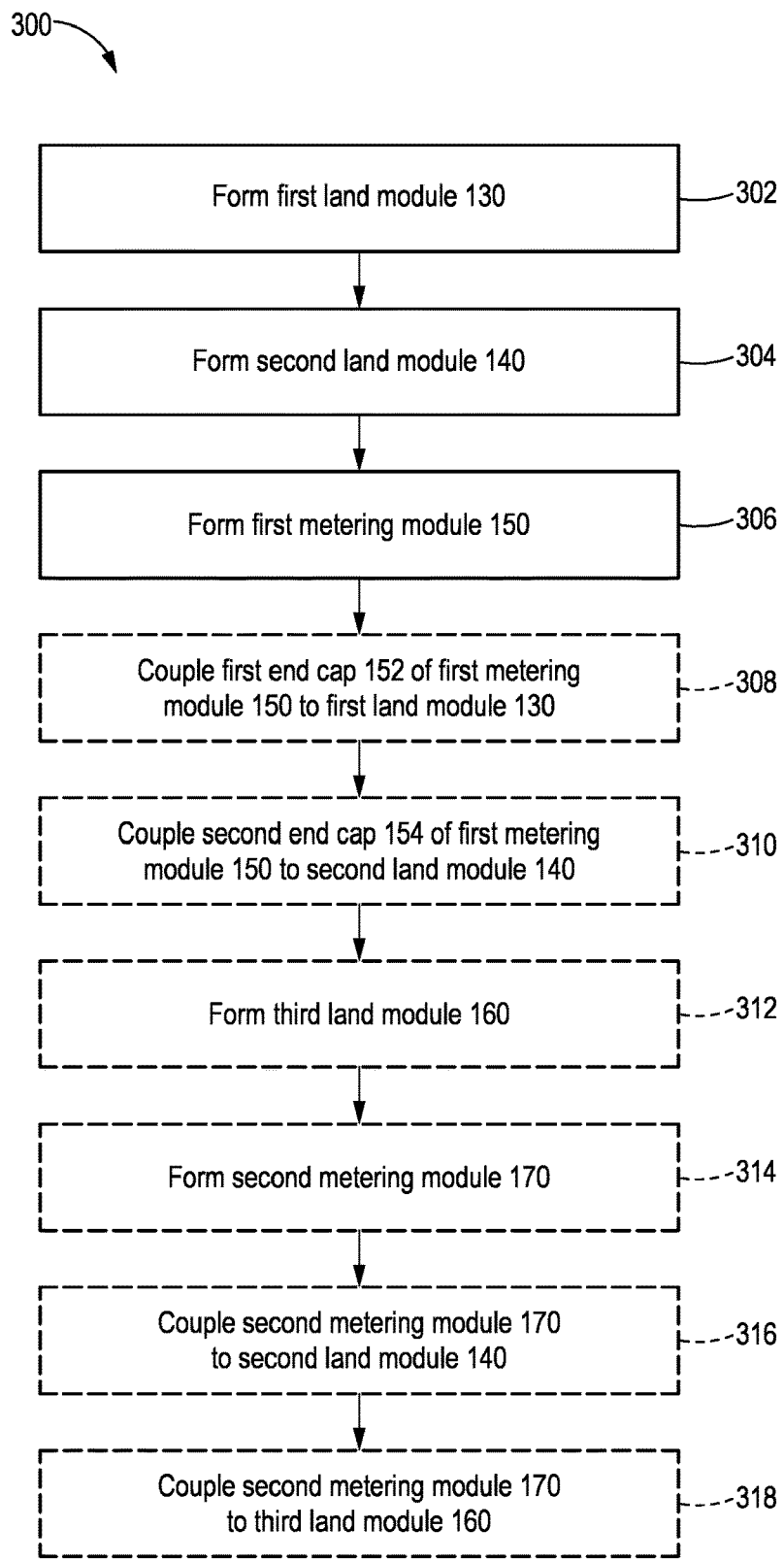
FIG. 8 is a schematic block diagram of a method of forming a spool for use in a housing.

The pillars 184, 194 may be formed with different cross-sectional shapes. In the examples illustrated at FIGS. 1-6, for example, each of the pillars 184, 194 has a circular cross-section 200. Alternatively, as shown in FIG. 7, the pillars 184, 194 may be formed with a non-circular cross-section 210. Still further, the non-circular cross-section 210 may have a major axis 212 and a minor axis 214. While not wishing to be bound by theory, it is believed that the non-circular cross-section 210 may further improve fluid flow characteristics through the first and second metering modules 150, 170. Additionally, it is believed that the non-circular cross-section 210 will resist rotation of the spool 120 within the housing 102, whereby fluid flowing around the pillars will generate forces that align the major axes 212 with the direction of fluid flow.

While the illustrated example includes first and second metering modules 150, 170 that are configured identically, in other examples the first metering module 150 may have a configuration that is different than the second metering module 170. That is, the number, placement, cross-sectional shape, and configuration of the pillars 184 in the first metering module 150 may be different than that for the pillars 194 of the second metering module 170. Additionally or alternatively, the first and second end caps 152, 154 of the first metering module 150 may have a different overall configuration, number and shape of metering pockets 156, and location and shape of bevel surface 158, than the first and second end caps 172, 174 of the second metering module 170.

It should be noted that any of these components and their features may be differently configured in other embodiments of the present disclosure. The components of the valve assembly may be manufactured from any suitable material including, but not limited to, steel, aluminum, thermoplastics, etc. as long as the material is durable enough to withstand the pressures, and are chemically compatible with the fluids being used.

Any of the dimensions, configurations, etc. discussed herein may be varied as needed or desired to be different than any value or characteristic specifically mentioned herein or shown in the drawings for any of the embodiments.

INDUSTRIAL APPLICABILITY

In practice, a valve assembly, and/or a valve component such as spool constructed according any embodiment disclosed herein may be sold, bought, manufactured or otherwise obtained in an OEM (original equipment manufacturer) or after-market context. In some cases, various components of the valve assembly, and the spool may be provided as a kit to repair or retrofit a hydraulic system or other apparatus (e.g., a lubricant system etc.) in the field.

While each of the modules may be formed using any suitable manufacturing technique, the use of particular manufacturing techniques for specific types of modules may recognize additional advantages. For example, the first, second, and third land modules 130, 140, and 160, may be manufactured using subtractive manufacturing. As used herein, the term "subtractive manufacturing" is intended to include processes in which a workpiece may be formed into a near net shape, such as by conventional casting or molding, and then subsequently formed into a final net shape by removing material from the workpiece, such as milling, grinding, cutting, sanding, knurling, drilling, turning, machining, and polishing. Using subtractive manufacturing to form the first, second, and third land modules 130, 140, and 160 may reduce time and costs to fabricate these components. Furthermore, in some examples, the first and second metering modules 150, 170, may be manufactured using additive manufacturing. As used herein, the term "additive manufacturing" is intended to include processes that deposit material in successive layers onto a substrate to build a workpiece, such as material jetting, binder jetting, powder bed fusion, stereolithography, sheet lamination, directed energy deposition, and material extrusion. Using additive manufacturing to form the first and second metering modules may reduce time and costs associated with fabricate the more intricate and complex shapes of the pillars 184, 194, end caps 152, 154, 172, and 174, and metering pockets 156, 176. While the foregoing example uses subtractive manufacturing to form the land modules 130, 140, and 160 and additive manufacturing to form the metering modules 150, 170, it will be appreciated that any suitable manufacturing technique may be used to form each of the modules 130, 140, 150, 160, and 170.

FIG. 7 depicts a method 300 of forming the spool 120 for use with the housing 102. The spool valve housing 102 has the housing inner surface 104 defining the spool cavity 106. The method 300 includes forming, at block 302, the first land module 130 with the first land module circumferential surface 132 sized for sliding contact with the housing inner surface 104. At block 304, the method includes forming the second land module 140 with the second land module circumferential surface 142 sized for sliding contact with the housing inner surface 104. At block 306, the first metering module 150 is formed, via additive manufacturing, with the first end cap 152 and the second end cap 154. At block 308, the first end cap 152 of the first metering module 150 is coupled to the first land module 130, and at block 310, the second end cap 154 of the first metering module 150 is coupled to the second land module 140. When assembled, the first land module 130, the first metering module 150, and the second land module 140 extend sequentially along a spool longitudinal axis.

Optionally, the method 300 further includes, at block 312, forming the third land module 160 with the third land module circumferential surface 162 sized for sliding contact with the housing inner surface 104. At block 314, the method 300 further may include forming, via additive manufacturing, the second metering module 170 having the first end cap 172 and the second end cap 174. Still further, the method 300 may include coupling the first end cap 172 of the second metering module 170 to the second land module 140 at block 316, and coupling the second end cap 174 of the second metering module 170 to the third land module 160 at block 318, wherein the second metering module 170 and the third land module 160 extend along the spool longitudinal axis. In some examples, each of the first land module 130, the second land module 140, and the third land module 160 is formed via subtractive manufacturing.

In some examples, forming, via additive manufacturing, the first metering module 150 (at block 306) further includes forming the at least two pillars 184 of the first metering module 150, which extend between the first end cap 152 of the first metering module 150 and the second end cap 154 of the first metering module 150, wherein the at least two pillars 184 of the first metering module 150 are entirely disposed within the virtual first metering module hollow cylinder area 182. Similarly, forming, via additive manufacturing, the second metering module 170 (at block 314) further includes forming the at least two pillars 194 of the second metering module 170, which extend between the first end cap 172 of the second metering module 170 and the second end cap 174 of the second metering module 170, wherein the at least two pillars 194 of the second metering module 170 are entirely disposed within the virtual second metering module hollow cylinder area 192.

In still further examples, forming, via additive manufacturing, the first metering module 150 (at block 306) further includes forming the at least one metering pocket 156 in each of the first end cap 152 and the second end cap 154 of the first metering module 150, and forming, via additive manufacturing, the second metering module 170 (at block 314) further comprises forming the at least one metering pocket 176 in each of the first end cap 172 and the second end cap 174 of the second metering module 170.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A spool defining a spool longitudinal axis, the spool comprising:
   a first land module defining a first land module circumferential surface;
   a second land module defining a second land module circumferential surface; and a first metering module, wherein:
  a first end cap of the first metering module is coupled to the first land module;
  a second end cap of the first metering module is coupled to the second land module;
  the first metering module defines a virtual first metering module central core area concentric with the spool longitudinal axis and a virtual first metering module hollow cylinder area surrounding the virtual first metering module central core area; and
  at least two pillars of the first metering module extend between the first end cap of the first metering module and the second end cap of the first metering module, wherein the at least two pillars of the first metering module are entirely disposed within the virtual first metering module hollow cylinder area.

2. The spool of claim 1, wherein each of the first end cap and the second end cap of the first metering module defines at least one metering pocket.

3. The spool of claim 2, wherein each of the first end cap and the second end cap of the first metering module comprises a bevel surface, and each of the at least one metering pocket extends into a respective bevel surface of the first end cap and the second end cap of the first metering module.

4. The spool of claim 1, wherein each of the at least two pillars of the first metering module has a circular cross-section.

5. The spool of claim 1, wherein each of the at least two pillars of the first metering module has a non-circular cross-section, the non-circular cross-section including a major axis and a minor axis.

6. The spool of claim 1, further comprising:
a third land module defining a third land module circumferential surface; and
a second metering module, wherein:
  a first end cap of the second metering module is coupled to the second land module; and
  a second end cap of the second metering module is coupled to the third land module.

7. The spool of claim 6, wherein:
the second metering module defines a virtual second metering module central core area concentric with the spool longitudinal axis, and a virtual second metering module hollow cylinder area surrounding the virtual second metering module central core area; and
at least two pillars of the second metering module extend between the first end cap of the second metering module and the second end cap of the second metering module, wherein the at least two pillars of the second metering module are entirely disposed within the virtual second metering module hollow cylinder area.

8. The spool of claim 6, wherein:
the first metering module is threadably coupled to each of the first land module and the second land module; and
the second metering module is threadably coupled to each of the second land module and the third land module.

9. The spool of claim 1, further comprising a housing having a housing inner surface defining a spool cavity, the housing further defining a first port, a second port, and a third port, wherein each of the first port, the second port, and the third port extends through the housing inner surface and fluidly communicates with the spool cavity, and the spool being disposed in the spool cavity.

10. A spool defining a spool longitudinal axis, the spool comprising:
a first land module defining a first land module circumferential surface;
a second land module defining a second land module circumferential surface; and
a first metering module, wherein:
  a first end cap of the first metering module is coupled to the first land module;
  a second end cap of the first metering module is coupled to the second land module; and
  one of the first and second end caps of the first metering module defines at least one metering pocket.

11. The spool of claim 10, further comprising a housing having a housing inner surface defining a spool cavity, the housing further defining a first port, a second port, and a third port, wherein each of the first port, the second port, and the third port extends through the housing inner surface and fluidly communicates with the spool cavity, and the spool being disposed in the spool cavity.

12. The spool of claim 10, further comprising:
a third land module defining a third land module circumferential surface; and
a second metering module, wherein:
  a first end cap of the second metering module is coupled to the second land module;
  a second end cap of the second metering module is coupled to the third land module; and
  one of the first and second end caps of the second metering module defines at least one metering pocket.

13. A spool defining a spool longitudinal axis, the spool comprising:
a first land module defining a first land module circumferential surface;
a second land module defining a second land module circumferential surface; and
a first metering module, wherein:
  a first end cap of the first metering module is threadably coupled to the first land module; and
  a second end cap of the first metering module is threadably coupled to the second land module.

14. The spool of claim 13, further comprising a housing having a housing inner surface defining a spool cavity, the housing further defining a first port, a second port, and a third port, wherein each of the first port, the second port, and the third port extends through the housing inner surface and fluidly communicates with the spool cavity, and the spool being disposed in the spool cavity.

15. The spool of claim 13, further comprising:
a third land module defining a third land module circumferential surface; and
a second metering module, wherein:
  a first end cap of the second metering module is threadably coupled to the second land module; and
  a second end cap of the second metering module is threadably coupled to the third land module.

16. The spool of claim 13, wherein the first metering module includes:
the first end cap adjacent a first end of the first metering module;
the second end cap adjacent a second end of the first metering module, the first and second end caps being spaced apart along the spool longitudinal axis of the first metering module; and at least two pillars, each pillar extending between the first and second end caps, the pillars being spaced apart and radially spaced from the spool longitudinal axis.

17. A spool defining a spool longitudinal axis, the spool comprising:
  a first land module defining a first land module circumferential surface;
  a second land module defining a second land module circumferential surface; and
  a first metering module including:
    a first end adjacent the first land module;
    a second end spaced from the first end along the spool longitudinal axis and adjacent the second land module;
    a first end cap adjacent the first end of the first metering module;
    a second end cap adjacent the second end of the first metering module, the first and second end caps being spaced apart along the spool longitudinal axis of the first metering module; and
    at least two pillars, each pillar extending between the first and second end caps, the pillars being spaced apart and radially spaced from the spool longitudinal axis.

18. The spool of claim 17, wherein each of the at least two pillars of the first metering module has a circular cross-section.

19. The spool of claim 17, wherein each of the at least two pillars of the first metering module has a non-circular cross-section, the non-circular cross-section including a major axis and a minor axis.

20. The spool of claim 17, further comprising a housing having a housing inner surface defining a spool cavity, the housing further defining a first port, a second port, and a third port, wherein each of the first port, the second port, and the third port extends through the housing inner surface and fluidly communicates with the spool cavity, and the spool being disposed in the spool cavity.

\* \* \* \* \*